US012713014B2

(12) United States Patent
Hu et al.

(10) Patent No.: US 12,713,014 B2
(45) Date of Patent: Aug. 18, 2026

(54) APPLYING A SCALING FACTOR TO SELECT A FILTER FOR FILTERING DECODED VIDEO DATA

(71) Applicant: QUALCOMM Incorporated, San Diego, CA (US)

(72) Inventors: Nan Hu, San Diego, CA (US); Marta Karczewicz, San Diego, CA (US); Vadim Seregin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/882,548

(22) Filed: Sep. 11, 2024

(65) Prior Publication Data

US 2025/0119540 A1 Apr. 10, 2025

Related U.S. Application Data

(60) Provisional application No. 63/588,585, filed on Oct. 6, 2023.

(51) Int. Cl.
*H04N 19/117* (2014.01)
*H04N 19/124* (2014.01)
*H04N 19/176* (2014.01)

(52) U.S. Cl.
CPC ......... *H04N 19/117* (2014.11); *H04N 19/124* (2014.11); *H04N 19/176* (2014.11)

(58) Field of Classification Search
CPC .. H04N 19/124; H04N 19/117; H04N 19/115; H04N 19/176
See application file for complete search history.

(56) References Cited

U.S. PATENT DOCUMENTS 10,728,549 B2 * 7/2020 Yin .................... H04N 19/117
2019/0342549 A1 * 11/2019 Wennersten ........... H04N 19/82
2020/0296425 A1 * 9/2020 Seregin ................ H04N 19/174
2021/0195182 A1 * 6/2021 Du ...................... H04N 19/176

(Continued)

OTHER PUBLICATIONS

Coban M., et al., "Algorithm Description of Enhanced Compression Model 10 (ECM 10)", Joint Video Experts Team (JVET) of ITU-T SG 16 WP 3 and ISO/IEC JTC 1/SC 29, 31st Meeting, Geneva, CH, Jul. 11-19, 2023, No. JVET-AE2025, m64602, Oct. 2, 2023, 82 Pages.

(Continued)

*Primary Examiner* — Joseph G Ustaris
(74) *Attorney, Agent, or Firm* — Shumaker & Sieffert, P. A.

(57) ABSTRACT

A device for filtering decoded video data includes a memory configured to store video data; and a processing system implemented in circuitry and configured to: calculate a filter selection value for a decoded block of video data; quantize the filter selection value using a scaling factor to form a quantized filter selection value; select a filter for the decoded block according to the quantized filter selection value; and filter the decoded block using the selected filter. The filter selection value may be an activity value that is the sum of horizontal and vertical Laplacian values. The processing system may quantize the filter selection value using a scaling factor, which the processing system may determine based on a color component to which the block belongs and/or a color sampling format of a picture including the block.

20 Claims, 6 Drawing Sheets

(56) References Cited

U.S. PATENT DOCUMENTS

| | | | | |
|---|---|---|---|---|
| 2022/0279185 | A1* | 9/2022 | Zhu | H04N 19/82 |
| 2024/0357095 | A1 | 10/2024 | Karczewicz et al. | |

OTHER PUBLICATIONS

Hu N (Qualcomm Incorporated)., et al., "Non-EE2: Fixed filter for Chroma ALF", Joint Video Experts Team (JVET) of ITU-T SG 16 WP 3 and ISO/IEC JTC 1/SC 29, 32nd Meeting, Hannover, DE, Oct. 13-20, 2023, No. JVET-AF0179, Oct. 15, 2023, 3 Pages.

International Search Report and Written Opinion—PCT/US2024/046345—ISA/EPO—Dec. 19, 2024.

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.

* cited by examiner

APPLYING A SCALING FACTOR TO SELECT A FILTER FOR FILTERING DECODED VIDEO DATA

This application claims the benefit of U.S. Provisional Application No. 63/588,585, filed Oct. 6, 2023, the entire contents of which are hereby incorporated by reference.

TECHNICAL FIELD

This disclosure relates to video coding, including video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called “smart phones,” video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for filtering video data, e.g., decoded video data. The filter may be applied as an in-loop filter or a post loop filter. The filter may be selected from a set of fixed filters. For example, a video encoder and a video decoder (generally, a “video coder”) may be configured with the set of filters, such as a set of fixed filters. The video coder may then calculate a filter selection value for a block of video data. The filter selection value may be, for example, an activity value or a variance value. The video coder, per the techniques of this disclosure, may apply a scaling factor to the filter selection value to form a quantized filter selection value, then use the quantized filter selection value to select a filter from the set of filters. The set of filters may be a set of fixed filters or a set of adaptive loop filters for which statistics are separately tracked.

In one example, a method of filtering decoded video data includes: calculating a filter selection value for a decoded block of video data; quantizing the filter selection value using a scaling factor to form a quantized filter selection value; selecting a filter for the decoded block according to the quantized filter selection value; and filtering the decoded block using the selected filter.

In another example, a device for filtering decoded video data includes: a memory configured to store video data; and a processing system implemented in circuitry and configured to: calculate a filter selection value for a decoded block of video data; quantize the filter selection value using a scaling factor to form a quantized filter selection value; select a filter for the decoded block according to the quantized filter selection value; and filter the decoded block using the selected filter.

In another example, a device for filtering decoded video data includes: means for calculating a filter selection value for a decoded block of video data; means for quantizing the filter selection value using a scaling factor to form a quantized filter selection value; means for selecting a filter for the decoded block according to the quantized filter selection value; and means for filtering the decoded block using the selected filter.

In another example, a computer-readable storage medium has stored thereon instructions that, when executed, cause a processor to: calculate a filter selection value for a decoded block of video data; quantize the filter selection value using a scaling factor to form a quantized filter selection value; select a filter for the decoded block according to the quantized filter selection value; and filter the decoded block using the selected filter.

The details of one or more examples are set forth in the accompanying drawings and the description below. Other features, objects, and advantages will be apparent from the description, drawings, and claims.

DETAILED DESCRIPTION

Figure 1:
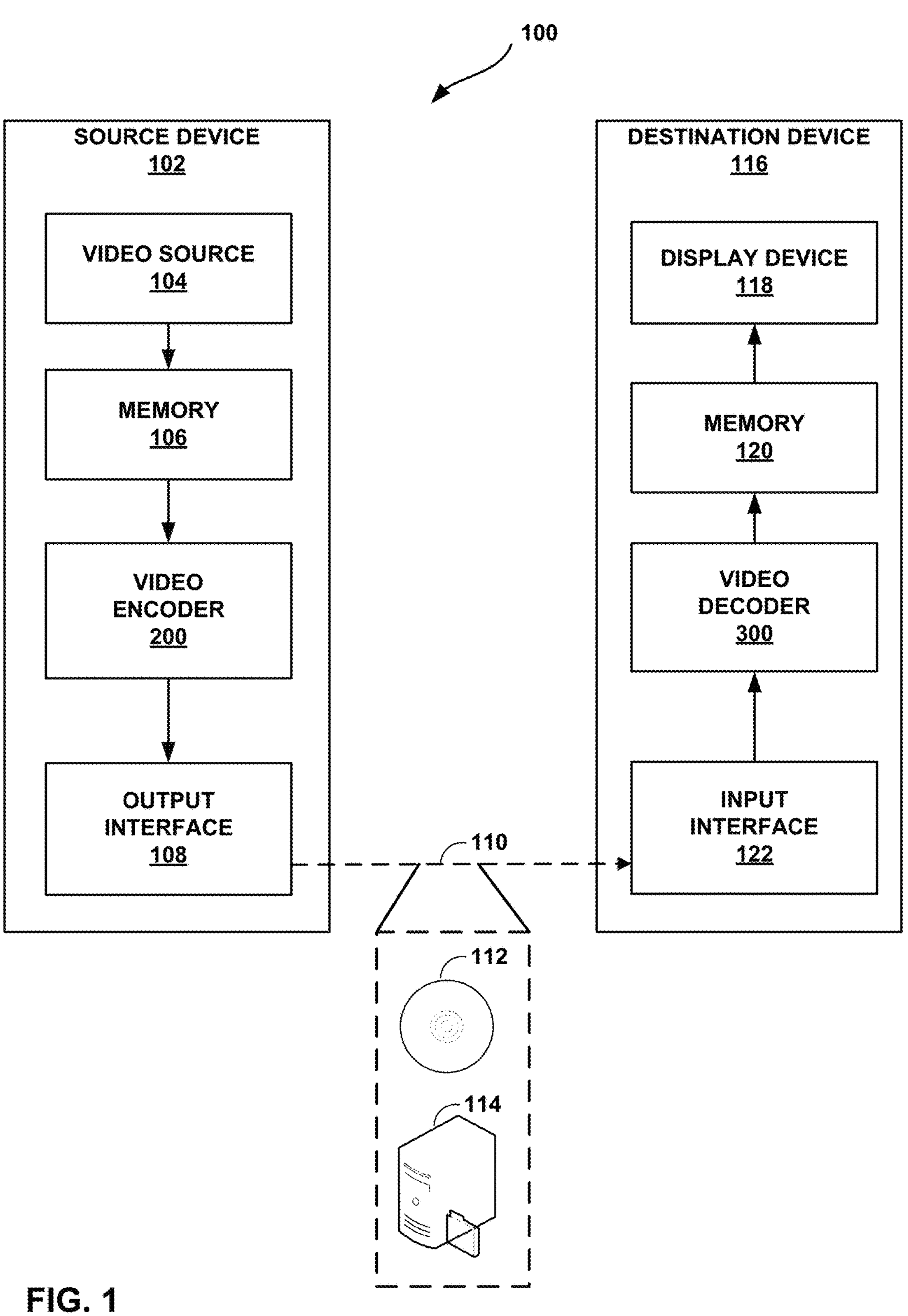
FIG. 1 is a block diagram illustrating an example video encoding and decoding system that may perform the techniques of this disclosure.

In a typical video encoder, a frame of an original video sequence is partitioned into rectangular regions or blocks, which are encoded in Intra-mode (I-mode) or Inter-mode. The blocks are coded using some kind of transform coding, such as DCT coding. However, pure transform-based coding only reduces the inter-pixel correlation within a particular block, without considering the inter-block correlation of pixels, and it still produces high bitrates for transmission. Current digital image coding standards also exploit certain methods that reduce the correlation of pixel values between blocks.

In general, blocks encoded in inter mode (P or B-mode) are predicted from a number of previously coded and transmitted frames. The prediction information of a block can be represented, for example, by a two-dimensional (2D) motion vector. For the blocks encoded in intra mode (I-mode), the predicted block is formed using spatial prediction from previously encoded (and subsequently decoded) neighboring blocks within the same frame. The prediction error, i.e., the difference between the block being encoded and the predicted block is represented as a set of weighted basis functions of some discrete transform. The transform is typically performed on a block basis. The weights—transform coefficients—are subsequently quantized. Quantization introduces loss of information and, therefore, quantized coefficients have lower precision than the originals.

Quantized transform coefficients, together with motion vectors and some control information, form a complete coded sequence representation and are referred to as syntax elements. Prior to transmission from the encoder to the decoder, all syntax elements may be entropy coded, so as to further reduce the number of bits needed for their representation.

In the decoder, a block in the current frame is obtained by first constructing its prediction in the same manner as in the encoder and by adding to the prediction the compressed prediction error. The compressed prediction error is found by weighting the transform basis functions using the quantized coefficients. The difference between the reconstructed frame and the original frame is called reconstruction error.

In the field of video coding, it is common to apply filtering in order to enhance the quality of a decoded video signal. The filter can be applied as a post-filter, where filtered frame is not used for prediction of future frames or in-loop filter, where filtered frame is used to predict future frame. A filter can be designed by minimizing the error between the original signal and the decoded filtered signal. Similarly, to transform coefficients, the coefficients of the filter h(k,l), k=−K, . . . , K, l=−K, . . . K may be quantized:

$$c(k, l) = round(normFactor \cdot h(k, l))$$

These quantized values may then be coded and sent to the decoder. The normFactor is usually equal to $2^n$. The larger the value of normFactor, the more precise the quantization, such that the quantized filter coefficients c(k,l) provide better performance. On the other hand, larger values of normFactor produce coefficients c(k,l) requiring more bits to transmit.

In the decoder, the decoded filter coefficients c(k,l) are applied to the reconstructed image R(i,j) as follows:

$$\tilde{R}(i, j) = \sum_{k=-K}^{K} \sum_{l=-K}^{K} c(k, l) R(i+k, j+l), \tag{1}$$

where i and j are the coordinates of the pixels within the frame. The filter coefficients can be also applied to the differences f(k,l) between the to-be-filtered sample R(i,j) and its neighboring samples:

$$f(k, l) = R(i+k, j+l) - R(i, j). \tag{2}$$

In this case, the sample $\tilde{R}$(x,y) is obtained by adding the resulting sum to the reconstructed sample R(x,y). The differences f (k,l) can be modified, e.g., by applying clipping.

One example of filtering is an Adaptive Loop Filter (ALF) with block-based adaption. Sub-block or pixel level filter adaptation may be applied. In some examples, each M×M block is categorized into one out of 25 classes based on its directionality D and quantized value of activity A, e.g.:

$$C = 5D + A. \tag{3}$$

where C represents the class. Each class may be assigned a corresponding filter.

Laplacian based classification may be used to derive class C for the samples in a target block. A window that covers the target block may be used for classifying that target block. The activity and directionality may be derived using values of the horizontal, vertical and, two diagonal gradients calculated using 1-D Laplacian:

$$H_{k,l} = |2R(k, l) - R(k-1, l) - R(k+1, l)| \tag{4}$$

$$V_{k,l} = |2R(k, l) - R(k, l-1) - R(k, l+1)| \tag{5}$$

$$D1_{k,l} = |2R(k, l) - R(k-1, l-1) - R(k+1, l+1)| \tag{6}$$

$$D2_{k,l} = |2R(k, l) - R(k-1, l+1) - R(k+1, l-1)| \tag{7}$$

The sums of the horizontal, the vertical, and the two diagonal gradients within the window may be denoted, respectively, as $g_h$, $g_v$, $g_{d1}$ and $g_{d2}$. The directionality D may be determined by comparing:

$$r_{h,v} = \frac{\max(g_h, g_v)}{\min(g_h, g_v)}, \; r_{d1,d2} = \frac{\max(g_{d1}, g_{d2})}{\min(g_{d1}, g_{d2})} \tag{8}$$

to a set of thresholds. Then, the activity value A may be derived by calculating a sum of $g_h$ and $g_v$ and comparing these sums with the set of thresholds.

Before filtering, certain geometric transformations, such as rotation, diagonal and vertical flip, can be applied to the pixels in the filter support region (pixels which are multiplied by filtered coefficients) depending on the orientation of the gradient of the filtered pixel. These transformations increase similarity between different regions within the picture, e.g., their directionality. This can reduce the number of filters which have to be send to the decoder hence reducing number of bits required to represent them, or alternatively reduce the reconstruction error. Applying the transformations to the filter support region is equivalent to applying them directly to the filter coefficients.

To reduce the number of bits required to represent the filter coefficients, different classes can be merged. The information of which classes are merged may be provided from the encoder to the decoder by sending, for each of the 25 classes, an index $i_C$. Classes having the same index $i_C$ may then share the same filter.

The ALF coefficients of reference pictures may be stored and be reused as ALF coefficients of a current picture (i.e., a picture coded after the reference pictures). The current picture may be filtered using ALF coefficients stored for the reference pictures, and bypass the ALF coefficients signalling. In this case, only an index to one of the reference pictures is signalled, and the stored ALF coefficients of the indicated reference picture are simply inherited for the current picture.

In some examples, three different classifiers ($C_0$, $C_1$ and $C_2$) and three different sets of filters ($F_0$, $F_1$ and $F_2$) may be used. Sets $F_0$ and $F_1$ contain fixed filters, with coefficients trained for classifiers $C_0$ and $C_1$. Coefficients of filters in $F_2$ may be signalled. Which filter from a set $F_i$ is used for a given sample may be decided by a class C assigned to a sample using classifier $C_i$. All 3 classifiers may be Laplacian based and differ from the classifier as discussed above by using a window having a different number of samples and a different number of thresholds to determine activity and directionality.

In some examples, a gaussian filter (another example of a fixed filter) is applied to samples before a deblocking filter. The signalled filter may also be applied to the output of the gaussian filter.

U.S. Provisional Application No. 63/495,981, filed Apr. 13, 2023, U.S. Provisional Application No. 63/507,021, filed Jun. 8, 2023, and U.S. Provisional Application No. 63/508,765, filed Jun. 16, 2023, describe an example difference/variance-based classifier, which may be used to classify blocks in order to select a filter (e.g., a fixed filter).

In some examples, for a target block in a reconstructed picture, to derive the class index C, a value m is calculated. The value m may be the standard deviation, variance, median or mean of a window p×q which may include the target block. In another example, the value m may be a sample value from the window. The difference between each sample value and m may be calculated inside a window which may include the target block. This window may be the same p×q window or a different window.

Another value v may be calculated based on the derived differences. The value v may be a sum of the absolute differences, or a sum of the squared differences, or the square root of a sum of the squared differences, or any other combination based on the derived differences.

The class index C may be derived from the value v. The value v may be further quantized to P by a scaling factor before deriving the class index. The quantized value D may be further clipped to be within the allowed class index range. The clipped value may be used as the class index C.

In general, this disclosure describes techniques for filtering video data, e.g., decoded video data. The filter may be applied as an in-loop filter or a post loop filter. The filter may be selected from a set of fixed filters. For example, a video encoder and a video decoder (generally, a "video coder") may be configured with the set of filters, such as a set of fixed filters. The video coder may then calculate a filter selection value for a block of video data. The filter selection value may be, for example, an activity value or a variance value. The video coder, per the techniques of this disclosure, may apply a scaling factor to the filter selection value to form a quantized filter selection value, then use the quantized filter selection value to select a filter from the set of filters. The set of filters may be a set of fixed filters or a set of adaptive loop filters for which statistics are separately tracked.

Classification for the block may be improved in this manner, which may lead to improved filtering performance by the selected filter. Thus, these techniques may reduce distortion when video data has been decoded and reproduced. Furthermore, because the resulting block may have less distortion, filtering blocks in this manner may improve performance of using the decoded, filtered blocks as reference for subsequently coded blocks, thereby reducing a bitrate of a corresponding bitstream.

In particular, classification for a block of video data may be improved by, after calculating an activity value (A as discussed above, e.g., a sum of horizontal and vertical Laplacian values), quantizing the activity value using a scaling factor. The scaling factor may be determined based on a color component and/or color sampling format of a target block and picture. Additionally or alternatively, a scaling factor used to quantize the derived value v, discussed above for a difference/variance classifier, may be determined based on the color component and/or color sampling format of a target block and picture.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for filtering video data. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for filtering video data. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream.

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards. The techniques of this disclosure, however, are not limited to any particular coding standard or format. In general, video encoder 200 and video decoder 300 may be configured to perform the techniques of this disclosure in conjunction with any video coding techniques that use filtering video data.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component may be an array or single sample from one of the three arrays (luma and two chroma) for a picture in 4:2:0, 4:2:2, or 4:4:4 color format, or an array or a single sample of the array for a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

According to the techniques of this disclosure, video encoder 200 and video decoder 300 may filter decoded blocks of video data. Video encoder 200 and video decoder 300 may perform such filtering "in-loop," such that the resulting filtered blocks are stored in a decoded picture buffer (DPB) for reference when predicting subsequent blocks of the video data.

As discussed above, video encoder 200 and video decoder 300 may be configured to determine a filter selection value, such as an activity value or a variance value, for a current block of video data to be filtered. The activity value may be a sum of horizontal and vertical Laplacian values. The variance value may be an aggregate of differences between samples of the current block and a value m, which may be determined using an aggregation of a window of samples, which may include at least part of the current block.

After calculating the filter selection value, video encoder 200 and video decoder 300 may quantize the filter selection value using a scaling factor. Video encoder 200 and video decoder 300 may determine the filter selection value according to a color component and/or a color sampling format of the current block. The color component may be one of luminance, blue hue chrominance, or red hue chrominance, while the color sampling format may be one of 4:2:0, 4:2:2, or 4:4:4. After calculating the quantized filter selection value, video encoder 200 and video decoder 300 may apply a filter corresponding to the quantized filter selection value to the current block to form a filtered block. This filtered block may be stored in a decoded picture buffer (DPB) and may also be output for display.

Figure 2:
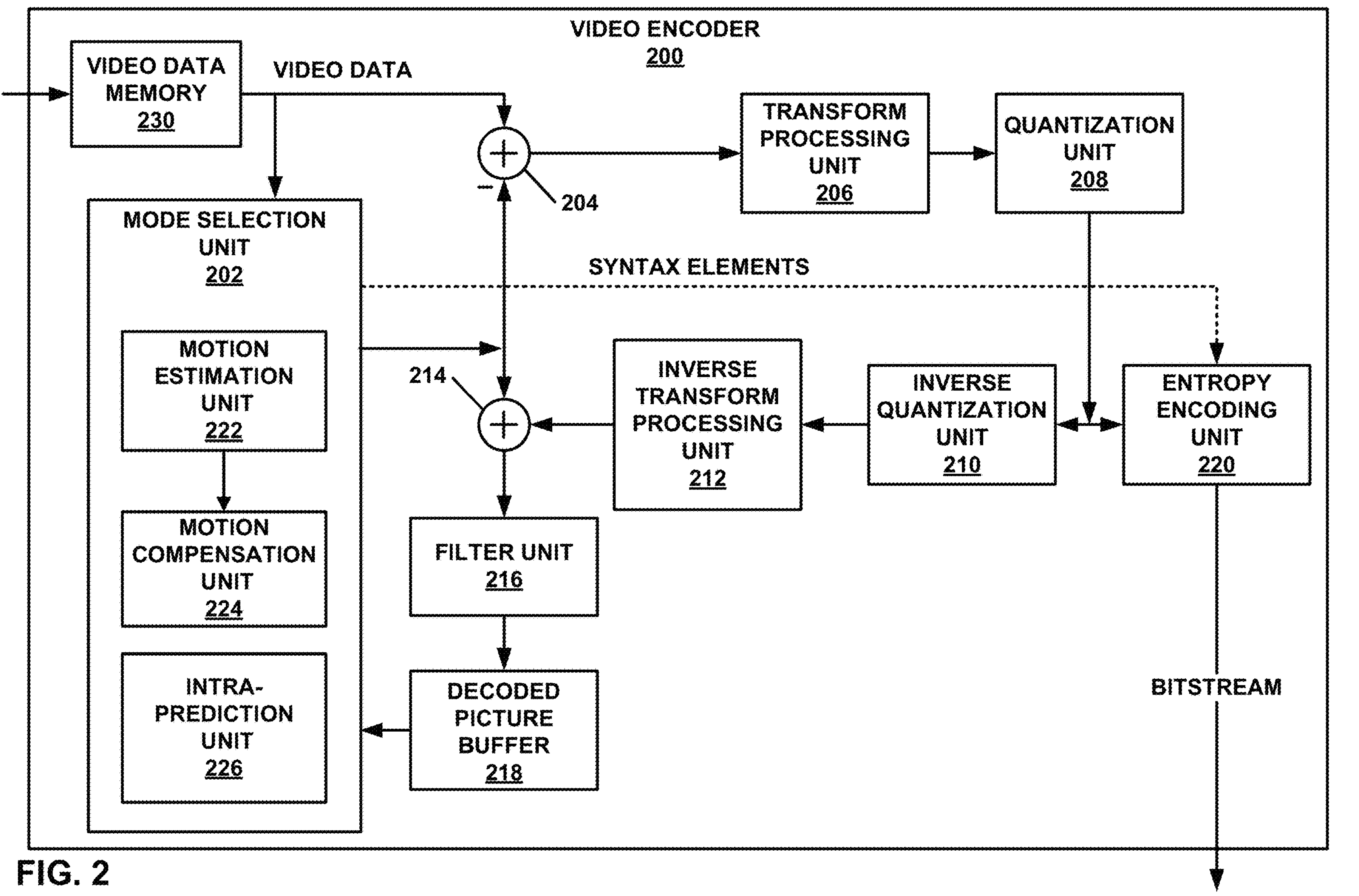
FIG. 2 is a block diagram illustrating an example video encoder that may perform the techniques of this disclosure.

FIG. 2 is a block diagram illustrating an example video encoder 200 that may perform the techniques of this disclosure. FIG. 2 is provided for purposes of explanation and should not be considered limiting of the techniques as broadly exemplified and described in this disclosure. For purposes of explanation, this disclosure describes video encoder 200 according to the techniques of VVC (ITU-T H.266, under development) and HEVC (ITU-T H.265). However, the techniques of this disclosure may be performed by video encoding devices that are configured to other video coding standards and video coding formats, such as AV1 and successors to the AV1 video coding format.

In the example of FIG. 2, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 2 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the MTT structure, QTBT structure. superblock structure, or the quadtree structure described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra prediction.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

When operating according to the AV1 video coding format, intra-prediction unit 226 may be configured to encode coding blocks of video data (e.g., both luma and chroma coding blocks) using directional intra prediction, non-directional intra prediction, recursive filter intra prediction, chroma-from-luma (CFL) prediction, intra block copy (IBC), and/or color palette mode. Mode selection unit 202 may include additional functional units to perform video prediction in accordance with other prediction modes.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples. Filter unit 216 may perform the techniques of this disclosure, e.g., quantizing a filter selection value (such as an activity value A and/or a variance value v) by a scaling factor to form a quantized filter selection value, then using the quantized scaling factor to determine a filter to use to filter a current block of video data for which the filter selection value was calculated. Filter unit 216 may then apply the determined filter to the current block. Filter unit 216 may determine the scaling factor according to, e.g., a color component (luminance, blue hue chrominance, or red hue chrominance) for the current block and/or a color sampling format (4:2:0, 4:2:2, or 4:4:4) for the current block.

When operating according to AV1, filter unit 216 may perform one or more filter operations on reconstructed blocks. For example, filter unit 216 may perform deblocking operations to reduce blockiness artifacts along edges of CUs. In other examples, filter unit 216 may apply a constrained directional enhancement filter (CDEF), which may be applied after deblocking, and may include the application of non-separable, non-linear, low-pass directional filters based on estimated edge directions. Filter unit 216 may also include a loop restoration filter, which is applied after CDEF, and may include a separable symmetric normalized Wiener filter or a dual self-guided filter.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as n-bit (e.g., 15-bit) cumulative distribution functions (CDFs). Entropy encoding unit 22 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Figure 3:
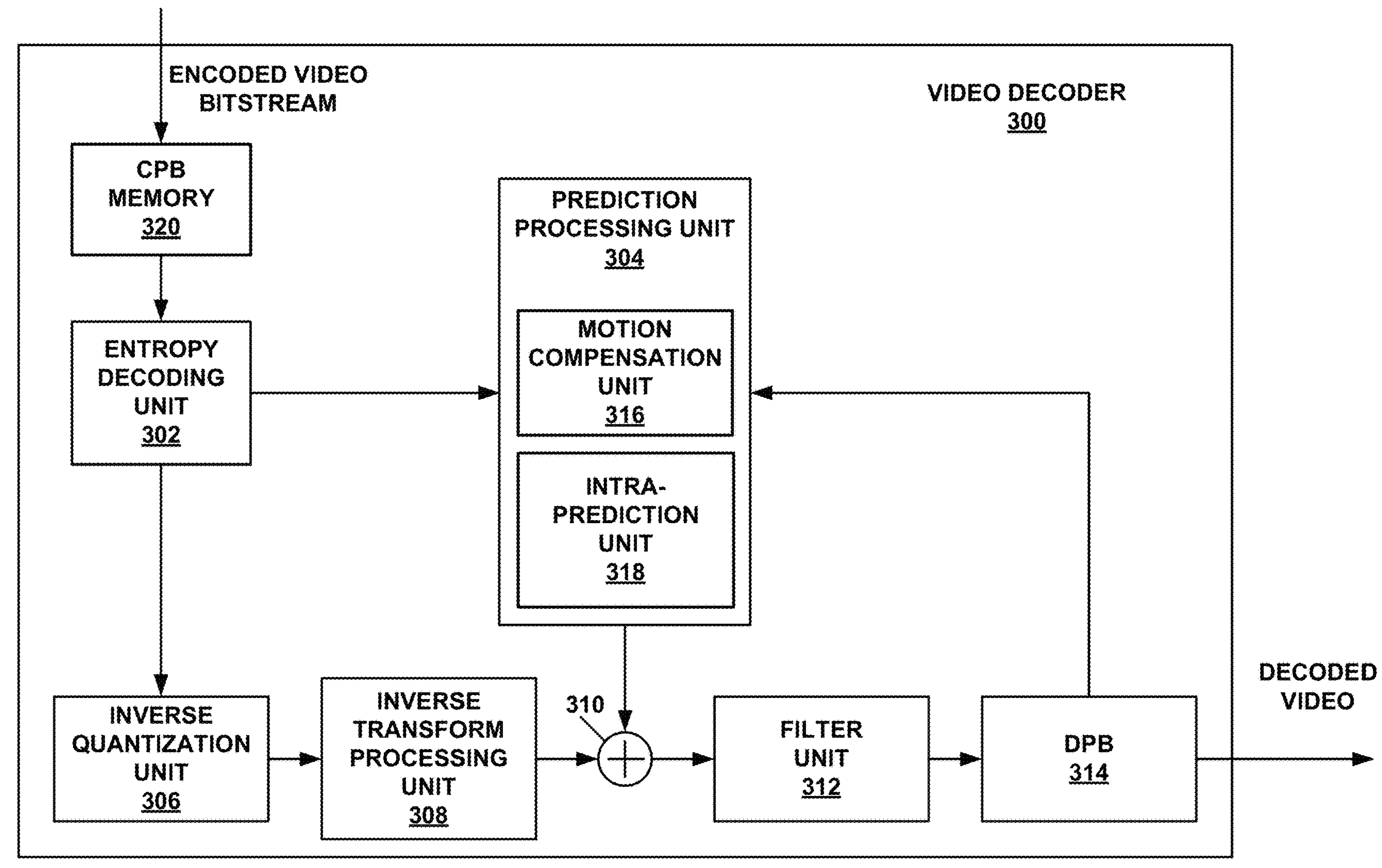
FIG. 3 is a block diagram illustrating an example video decoder that may perform the techniques of this disclosure.

FIG. 3 is a block diagram illustrating an example video decoder 300 that may perform the techniques of this disclosure. FIG. 3 is provided for purposes of explanation and is not limiting on the techniques as broadly exemplified and described in this disclosure. For purposes of explanation, this disclosure describes video decoder 300 according to the techniques of VVC (ITU-T H.266, under development) and HEVC (ITU-T H.265). However, the techniques of this disclosure may be performed by video coding devices that are configured to other video coding standards.

In the example of FIG. 3, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

When operating according to AV1, motion compensation unit 316 may be configured to decode coding blocks of video data (e.g., both luma and chroma coding blocks) using translational motion compensation, affine motion compensation, OBMC, and/or compound inter-intra prediction, as described above. Intra-prediction unit 318 may be configured to decode coding blocks of video data (e.g., both luma and chroma coding blocks) using directional intra prediction, non-directional intra prediction, recursive filter intra prediction, CFL, intra block copy (IBC), and/or color palette mode, as described above.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 3 are illustrated to assist with understanding the operations performed by video decoder 300. The units may be implemented as fixed-function circuits, programmable circuits, or a combination thereof. Similar to FIG. 2, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 2).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 2). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples. Filter unit 312 may perform the techniques of this disclosure, e.g., quantizing a filter selection value (such as an activity value A or a variance value v) by a scaling factor to form a quantized filter selection value, then using the quantized scaling factor to determine a filter to use to filter a current block of video data for which the filter selection value was calculated. Filter unit 312 may then apply the determined filter to the current block. Filter unit 312 may determine the scaling factor according to, e.g., a color component (luminance, blue hue chrominance, or red hue chrominance) for the current block and/or a color sampling format (4:2:0, 4:2:2, or 4:4:4) for the current block (or picture including the current block).

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

Figure 4:
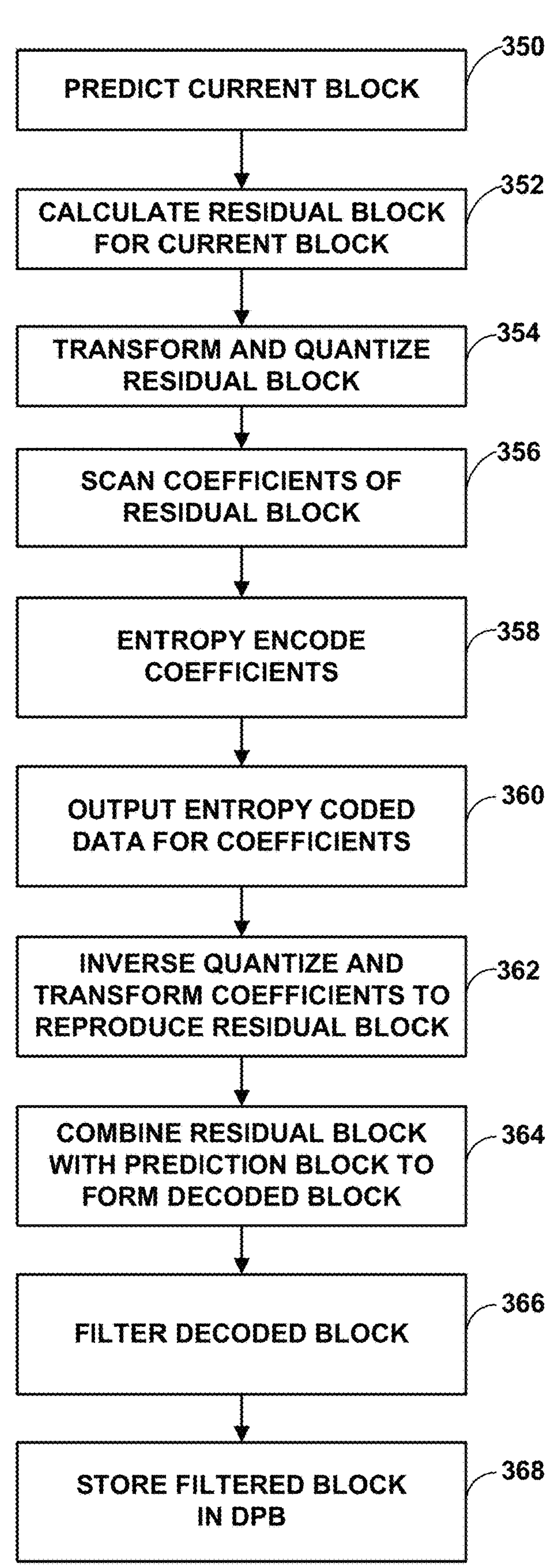
FIG. 4 is a flowchart illustrating an example method for encoding a current block in accordance with the techniques of this disclosure.

FIG. 4 is a flowchart illustrating an example method for encoding a current block in accordance with the techniques of this disclosure. The current block may comprise a current CU. Although described with respect to video encoder 200 (FIGS. 1 and 2), it should be understood that other devices may be configured to perform a method similar to that of FIG. 4.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, uncoded block and the prediction block for the current block. Video encoder 200 may then transform the residual block and quantize transform coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Video encoder 200 may also decode the current block after encoding the current block, to use the decoded version of the current block as reference data for subsequently coded data (e.g., in inter- or intra-prediction modes). Thus, video encoder 200 may inverse quantize and inverse transform the coefficients to reproduce the residual block (362). Video encoder 200 may combine the residual block with the prediction block to form a decoded block (364). Video encoder 200 may further filter the decoded block according to any of the various techniques of this disclosure (366), e.g., using a scaling factor applied to a filter selection value to determine a filter to apply to the decoded block, where the scaling factor may be determined according to a color component and/or color sampling format for the current block. Video encoder 200 may then store the filtered, decoded block in DPB 218 (368).

Figure 5:
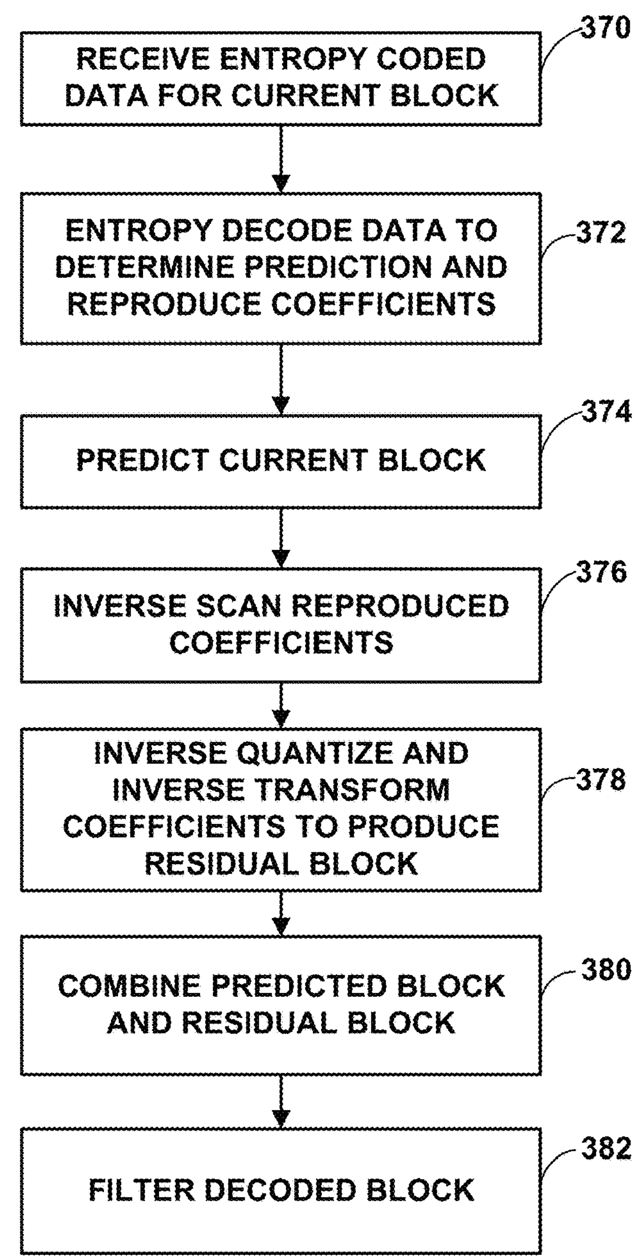
FIG. 5 is a flowchart illustrating an example method for decoding a current block in accordance with the techniques of this disclosure.

FIG. 5 is a flowchart illustrating an example method for decoding a current block of video data in accordance with the techniques of this disclosure. The current block may comprise a current CU. Although described with respect to video decoder 300 (FIGS. 1 and 3), it should be understood that other devices may be configured to perform a method similar to that of FIG. 5.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced transform coefficients (376), to create a block of quantized transform coefficients. Video decoder 300 may then inverse quantize the transform coefficients and apply an inverse transform to the transform coefficients to produce a residual block (378). Video decoder 300 may ultimately decode the current block by combining the prediction block and the residual block (380). Video decoder 300 may further filter the decoded block according to any of the various techniques of this disclosure (382), e.g., using a scaling factor applied to a filter selection value to determine a filter to apply to the decoded block, where the scaling factor may be determined according to a color component and/or color sampling format for the current block.

Figure 6:
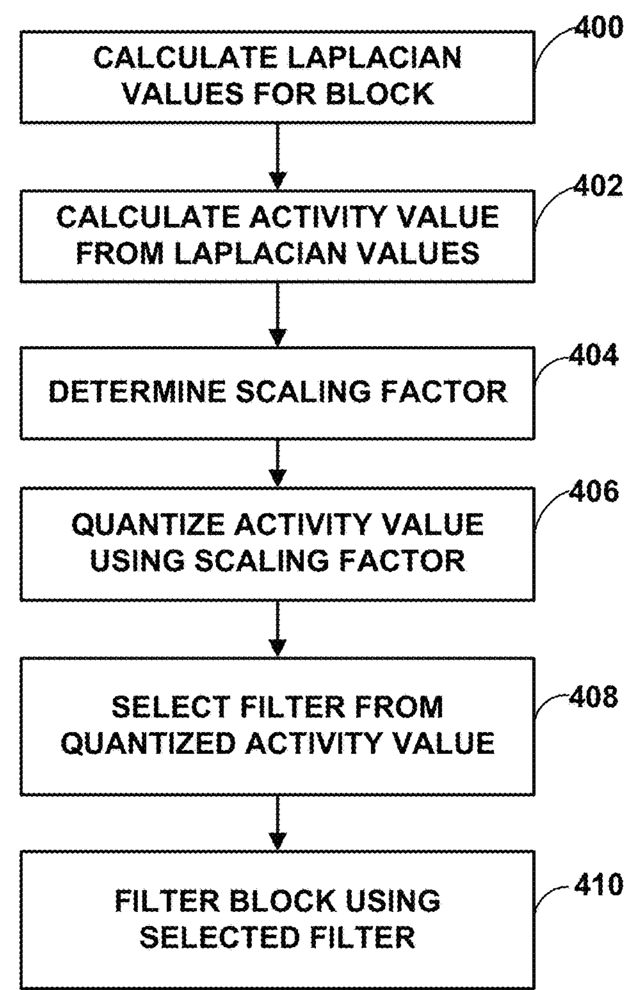
FIG. 6 is a flowchart illustrating an example method of filtering a decoded block of video data according to the techniques of this disclosure.

FIG. 6 is a flowchart illustrating an example method of filtering a decoded block of video data according to the techniques of this disclosure. The method of FIG. 6 may correspond to step 366 of FIG. 4 or step 382 of FIG. 5. The method of FIG. 6 is explained with respect to video decoder 300 of FIGS. 1 and 3, although other devices, such as video encoder 200, may perform this or a similar method.

Initially, video decoder 300 decodes a block of video data. For example, video decoder 300 may form a prediction block using a prediction mode, decode a residual block, and combine the prediction block with the residual block on a sample-by-sample basis to decode (reconstruct) the block. Video decoder 300 may then calculate Laplacian values for the block (400). For example, video decoder 300 may calculate a horizontal gradient value and a vertical gradient value, e.g., according to formulas (4) and (5) above, respectively.

Video decoder 300 may then calculate an activity value, also referred to herein as a filter selection value, from the Laplacian values (402). Video decoder 300 may also determine a scaling factor (404). For example, video decoder 300 may determine the scaling factor according to a color component of the block and/or according to a color sampling format for a picture including the block. The color component for the block may be one of Y, U, or V (i.e., luminance, blue hue chrominance, or red hue chrominance). The color sampling format may be one of 4:4:4, 4:2:2, or 4:2:0, or other such formats.

Video decoder 300 may then quantize the activity value using the scaling factor (406). For example, the scaling factor may indicate a number of bits by which to right shift the activity value, and video decoder 300 may perform a bitwise right shift by that number of buts. Video decoder 300 may then use the quantized activity value to select a filter (408), e.g., from a set of available filters. For example, as discussed above, the available filters may include fixed filters $F_0$ and $F_1$ and a filter $F_2$ for which coefficients are signaled in the bitstream, e.g., in a sequence parameter set (SPS) (e.g., as adaptive loop filter (ALF) coefficients) or picture parameter set (PPS). Video decoder 300 may then filter the decoded block using the selected filter (410).

In this manner, the method of FIG. 6 represents an example of a method of filtering a decoded block of video data, including calculating a filter selection value for a decoded block of video data; quantizing the filter selection value using a scaling factor to form a quantized filter selection value; selecting a filter for the decoded block according to the quantized filter selection value; and filtering the decoded block using the selected filter.

Various examples of the techniques of this disclosure are summarized in the following clauses:

Clause 1: A method of filtering decoded video data, the method comprising: calculating a filter selection value for a decoded block of video data; quantizing the filter selection value using a scaling factor to form a quantized filter selection value; selecting a filter for the decoded block according to the quantized filter selection value; and filtering the decoded block using the selected filter.

Clause 2: The method of clause 1, wherein the filter selection value comprises an activity value.

Clause 3: The method of clause 2, wherein calculating the activity value for the decoded block comprises: calculating one or more gradient values; and determining the activity value according to whether a sum of the gradient values exceeds a threshold.

Clause 4: The method of clause 3, wherein the one or more gradient values include a horizontal gradient value ($g_h$) and a vertical gradient value ($g_v$), and wherein determining the activity value comprises comparing $g_h$ to a first threshold and comparing $g_v$ to a second threshold.

Clause 5: The method of any of clauses 2-4, wherein calculating the activity value comprises calculating a sum of a horizontal Laplacian value and a vertical Laplacian value.

Clause 6: The method of clause 1, wherein the filter selection value comprises a variance value.

Clause 7: The method of clause 6, wherein calculating the variance value comprises calculating one of a standard deviation, a variance, a mean, or a median of a window of samples, the window of samples including at least part of the decoded block.

Clause 8: The method of clause 7, wherein calculating the variance value further comprises calculating differences between samples of the decoded block and the calculated one of the standard deviation, the variance, the mean, or the median of the window.

Clause 9: The method of clause 8, wherein calculating the variance value comprises calculating one of sum of absolute differences (SAD) of the differences, sum of squared differences (SSD) of the differences, or a square root of the sum of squared values of the differences.

Clause 10: The method of any of clauses 1-9, further comprising determining the scaling factor according to a color component for the current block.

Clause 11: The method of clause 10, wherein the color component comprises one of luminance, blue hue chrominance, or red hue chrominance.

Clause 12: The method of any of clauses 1-11, further comprising determining the scaling factor according to a color sampling format for the current block or a picture including the current block.

Clause 13: The method of clause 12, wherein the color sampling format comprises one of 4:2:0, 4:2:2, or 4:4:4.

Clause 14: The method of any of clauses 1-13, wherein selecting the filter comprises determining a class for the block according to the quantized activity value.

Clause 15: The method of any of clauses 1-14, further comprising encoding the current block prior to decoding the current block.

Clause 16: A device for decoding video data, the device comprising one or more means for performing the method of any of clauses 1-15.

Clause 17: The device of clause 16, wherein the one or more means comprise a processing system comprising one or more processors implemented in circuitry.

Clause 18: The device of any of clauses 16-17, further comprising a display configured to display the decoded video data.

Clause 19: The device of any of clauses 16-18, wherein the device comprises one or more of a camera, a computer, a mobile device, a broadcast receiver device, or a set-top box.

Clause 20: The device of clause 16-19, further comprising a memory configured to store the video data.

Clause 21: A computer-readable storage medium having stored thereon instructions that, when executed, cause a processor of a device for decoding video data to perform the method of any of clauses 1-15.

Clause 22: A device for decoding video data, the device comprising: means for calculating a filter selection value for a decoded block of video data; means for quantizing the filter selection value using a scaling factor to form a quantized filter selection value; means for selecting a filter for the decoded block according to the quantized filter selection value; and means for filtering the decoded block using the selected filter.

Clause 23: A method of filtering decoded video data, the method comprising: calculating a filter selection value for a decoded block of video data; quantizing the filter selection value using a scaling factor to form a quantized filter selection value; selecting a filter for the decoded block according to the quantized filter selection value; and filtering the decoded block using the selected filter.

Clause 24: The method of clause 23, wherein the filter selection value comprises an activity value.

Clause 25: The method of clause 24, wherein calculating the activity value for the decoded block comprises: calculating one or more gradient values; and determining the activity value according to whether a sum of the gradient values exceeds a threshold.

Clause 26: The method of clause 25, wherein the one or more gradient values include a horizontal gradient value ($g_h$) and a vertical gradient value ($g_v$), and wherein determining the activity value comprises comparing $g_h$ to a first threshold and comparing $g_v$ to a second threshold.

Clause 27: The method of clause 24, wherein calculating the activity value comprises calculating a sum of a horizontal Laplacian value and a vertical Laplacian value.

Clause 28: The method of clause 23, wherein the filter selection value comprises a variance value.

Clause 29: The method of clause 28, wherein calculating the variance value comprises calculating one of a standard deviation, a variance, a mean, or a median of a window of samples, the window of samples including at least part of the decoded block.

Clause 30: The method of clause 29, wherein calculating the variance value further comprises calculating differences between samples of the decoded block and the calculated one of the standard deviation, the variance, the mean, or the median of the window.

Clause 31: The method of clause 30, wherein calculating the variance value comprises calculating one of sum of absolute differences (SAD) of the differences, sum of squared differences (SSD) of the differences, or a square root of the sum of squared values of the differences.

Clause 32: The method of clause 23, further comprising determining the scaling factor according to a color component for the current block.

Clause 33: The method of clause 32, wherein the color component comprises one of luminance, blue hue chrominance, or red hue chrominance.

Clause 34: The method of clause 23, further comprising determining the scaling factor according to a color sampling format for the current block or a picture including the current block.

Clause 35: The method of clause 34, wherein the color sampling format comprises one of 4:2:0, 4:2:2, or 4:4:4.

Clause 36: The method of clause 23, wherein selecting the filter comprises determining a class for the block according to the quantized activity value.

Clause 37: The method of clause 23, further comprising encoding the current block prior to decoding the current block.

Clause 38: A device for filtering decoded video data, the device comprising: a memory configured to store video data; and a processing system implemented in circuitry and configured to: calculate a filter selection value for a decoded block of video data; quantize the filter selection value using a scaling factor to form a quantized filter selection value; select a filter for the decoded block according to the quantized filter selection value; and filter the decoded block using the selected filter.

Clause 39: The device of clause 38, further comprising a display configured to display the decoded video data.

Clause 40: The device of clause 38, wherein the device comprises one or more of a camera, a computer, a mobile device, a broadcast receiver device, or a set-top box.

Clause 41: The device of clause 38, further comprising a memory configured to store the video data.

Clause 42: A device for filtering decoded video data, the device comprising: means for calculating a filter selection value for a decoded block of video data; means for quantizing the filter selection value using a scaling factor to form a quantized filter selection value; means for selecting a filter for the decoded block according to the quantized filter selection value; and means for filtering the decoded block using the selected filter.

Clause 43: A computer-readable storage medium having stored thereon instructions that, when executed, cause a processor to: calculate a filter selection value for a decoded block of video data; quantize the filter selection value using a scaling factor to form a quantized filter selection value; select a filter for the decoded block according to the quantized filter selection value; and filter the decoded block using the selected filter.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of filtering decoded video data, the method comprising:

calculating a first filter selection value for a first color component of a decoded block of video data;

determining a first scaling factor for the first filter selection value for the first color component of the decoded block;

quantizing the first filter selection value using the first scaling factor to form a first quantized filter selection value;

selecting a first filter for the first color component of the decoded block according to the first quantized filter selection value as a first selected filter;

filtering the first color component of the decoded block using the first selected filter;

calculating a second filter selection value for a second color component of the decoded block, the second color component being different than the first color component;

determining a second scaling factor based on the second color component;

quantizing the second filter selection value using the second scaling factor to form a second quantized filter selection value;

selecting a second filter for the second color component according to the second quantized filter selection value; and filtering the second color component using the second filter.

2. The method of claim 1, wherein the first filter selection value comprises an activity value, and wherein calculating the activity value for the decoded block comprises:

calculating one or more gradient values; and determining the activity value according to whether a sum of the gradient values exceeds a threshold.

3. The method of claim 2, wherein the one or more gradient values include a horizontal gradient value ($g_h$) and a vertical gradient value ($g_v$), and wherein determining the activity value comprises comparing $g_h$ to a first threshold and comparing $g_v$ to a second threshold.

4. The method of claim 1, wherein the first filter selection value comprises an activity value, and wherein calculating the activity value comprises calculating a sum of a horizontal Laplacian value and a vertical Laplacian value.

5. The method of claim 1, wherein the first filter selection value comprises a variance value.

6. The method of claim 5, wherein calculating the variance value comprises calculating one of a standard deviation, a variance, a mean, or a median of a window of samples, the window of samples including at least part of the decoded block.

7. The method of claim 6, wherein calculating the variance value further comprises calculating differences between samples of the decoded block and the calculated one of the standard deviation, the variance, the mean, or the median of the window.

8. The method of claim 7, wherein calculating the variance value comprises calculating one of sum of absolute differences (SAD) of the differences, sum of squared differences (SSD) of the differences, or a square root of the sum of squared values of the differences.

9. The method of claim 1, wherein the first color component comprises one of luminance, blue hue chrominance, or red hue chrominance.

10. The method of claim 1, wherein determining the first scaling factor further comprises determining the first scaling factor the decoded block, the color information comprising a a color sampling format for the decoded block or a picture including the decoded block.

11. The method of claim 10, wherein the color sampling format comprises one of 4:2:0, 4:2:2, or 4:4:4.

12. The method of claim 1, wherein selecting the first filter comprises determining a class for the decoded block according to the first quantized filter selection value.

13. The method of claim 1, further comprising encoding the decoded block prior to decoding the decoded block.

14. A device for filtering decoded video data, the device comprising:

a memory configured to store video data; and a processing system implemented in circuitry and configured to:

calculate a first filter selection value for a first color component of a decoded block of video data;

determine a first scaling factor for the first filter selection value for the first color component for the decoded block;

quantize the first filter selection value using the first scaling factor to form a first quantized filter selection value;

select a first filter for the first color component of the decoded block according to the first quantized filter selection value as a first selected filter;

filter the first color component of the decoded block using the first selected filter;

calculate a second filter selection value for a second color component of the decoded block, the second color component being different than the first color component;

determine a second scaling factor based on the second color component;

quantize the second filter selection value using the second scaling factor to form a second quantized filter selection value;

select a second filter for the second color component according to the second quantized filter selection value; and filter the second color component using the second filter.

15. The device of claim 14, further comprising a display configured to display a picture that includes the decoded block of video data.

16. The device of claim 14, wherein the device comprises one or more of a camera, a computer, a mobile device, a broadcast receiver device, or a set-top box.

17. The device of claim 14, further comprising a memory configured to store the video data.

18. The device of claim 14, wherein the first filter selection value comprises an activity value, and wherein to calculate the activity value, the processing system is configured to calculate a sum of a horizontal Laplacian value and a vertical Laplacian value.

19. A device for filtering decoded video data, the device comprising:

means for calculating a first filter selection value for a first color component of a decoded block of video data;

means for determining a first scaling factor for the first filter selection value for the first color component of the decoded block;

means for quantizing the first filter selection value using the first scaling factor to form a first quantized filter selection value;

means for selecting a first filter for the decoded block according to the first quantized filter selection value;

means for filtering the first color component of the decoded block using the first selected filter;

means for calculating a second filter selection value for a second color component of the decoded block, the second color component being different than the first color component;

means for determining a second scaling factor based on the second color component;

means for quantizing the second filter selection value using the second scaling factor to form a second quantized filter selection value;

means for selecting a second filter for the second color component according to the second quantized filter selection value; and means for filtering the second color component using the second filter.

20. The device of claim 19, wherein the first filter selection value comprises an activity value, and wherein the means for calculating the activity value comprises means for calculating a sum of a horizontal Laplacian value and a vertical Laplacian value.

* * * * *